Patented Aug. 16, 1932

1,872,227

UNITED STATES PATENT OFFICE

NICHOLAS BENNETT, OF APPLETON, HERBERT DODD, OF GLAZEBROOK, MANCHESTER, WILLIAM C. SPRENT, OF CRESSINGTON, AND FRED HOLT, OF WEYBRIDGE, ENGLAND, ASSIGNORS TO IMPERIAL CHEMICAL INDUSTRIES LIMITED, A CORPORATION OF GREAT BRITAIN

MANUFACTURE OF BENZYL CHLORIDE

No Drawing. Application filed May 31, 1930, Serial No. 458,913, and in Great Britain June 1, 1929.

This invention relates to the manufacture of benzyl chloride from crude mixtures containing benzyl alcohol, such as the crude mixtures which may be recovered during the manufacture of benzyl cellulose. These mixtures may contain benzyl chloride, dibenzyl ether, and other substances e. g. cellulose derivatives.

We have now found that a preliminary treatment of the crude mixture mentioned above with a substance giving an alkaline reaction with water is one of the conditions of success, at any rate when the crude mixtures contain (as they usually do) traces of iron or other metal compounds which bring about polymerization of the benzyl chloride.

It is preferred to treat the crude mixture, containing but little water, with an anhydrous alkaline substance. For example the crude mixture mentioned above is treated in this way with anhydrous sodium carbonate, and filtered, when it is ready for treatment with hydrochloric acid. Instead of treating the mixture itself with hydrochloric acid, we may distill the mixture first in which case the distillate is used.

The treatment may be carried out either with hydrochloric acid gas or with aqueous solutions of hydrochloric acid. In the case of treatment with hydrochloric acid gas, we pass the mixture with hydrochloric acid gas down a heated tower. Very little external heat is required as the heat of reaction is sufficient to maintain a high enough temperature. In the case of treatment with aqueous solutions of hydrochloric acid, the mixture is digested with an excess of hydrochloric acid, preferably 28–36° Tw. at a temperature of about 80° C. In both cases the oily layer which separates is found to contain good yields of benzyl chloride which can be recovered by distillation.

Example I

The crude benzyl cellulose liquors containing benzyl alcohol are treated by mixing with 10 per cent by weight of calcined sodium carbonate and filtered.

200 parts of the treated benzyl cellulose liquor are mixed together with 300 parts hydrochloric acid specific gravity 1.14 and heated to 80–90° C. with constant agitation for 6 hours. The aqueous portion is then separated from the crude benzyl chloride layer. The crude benzyl chloride is then filtered through soda ash and distilled. 120 parts of benzyl chloride is recovered, 1.11 specific gravity containing 90% pure benzyl chloride.

Example II 250 parts of benzyl cellulose liquor (after treatment with soda ash) are passed slowly down an externally heated packed, silica tower, with a counter current of hydrochloric acid gas led in at the bottom of the tower.

The crude benzyl chloride is then treated as in Example I, giving 128 parts of benzyl chloride, of 1.11 specific gravity containing 90% pure benzyl chloride.

The benzyl cellulose liquor referred to in the above examples is obtainable when alkali cellulose is treated in the presence of water with benzyl chloride. Some of the latter reacts to form benzyl cellulose, some is hydrolized to form benzyl alcohol, and some reacts with this latter to form benzyl ether. The mixture is then a mixture of benzyl alcohol, benzyl chloride, benzyl ether, benzyl cellulose, sodium chloride, sodium hydroxide and water. This is extracted with a solvent which is a non-solvent for benzyl cellulose and the sodium salts, e. g., ethyl alcohol, and the benzyl compounds are thus removed. The alcohol is distilled off and the crude benzylation mixture results. It contains perhaps 10–30% of benzyl ether, 20–80% of benzyl alcohol, 5–10% of benzyl chloride, less than 5% of condensation product, less than 5% water, and perhaps some iron.

Among the advantages of this invention are the manufacture of benzyl chloride from the waste liquors resulting from the benzylation of cellulose. Other advantages will be apparent.

As many apparently widely different embodiments of this invention may be made without departing from the spirit and scope thereof, it is to be understood that we do not limit ourselves to the specific embodiments thereof except as defined in the appended claims.

We claim:

1. In the manufacture of benzyl chloride from liquors containing benzyl alcohol from the benzylation of cellulose the step which comprises treating the liquors with an anhydrous inorganic alkaline substance.

2. The manufacture of benzyl chloride from liquors containing benzyl alcohol from the benzylation of cellulose comprising treating the liquors with an anhydrous inorganic alkaline substance, separating the liquors from the alkaline substance, and thereafter treating the liquors with hydrochloric acid.

3. The manufacture of benzyl chloride from liquors containing benzyl alcohol from the benzylation of cellulose comprising treating the said liquors with sodium carbonate, separating the liquors from the sodium carbonate thereafter treating the liquors with hydrochloric acid at a temperature of about 80–90° C. and separating out the benzyl chloride.

4. The method of manufacturing benzyl chloride from liquors containing benzyl alcohol from the benzylation of cellulose comprising mixing the said liquors with about 10% by weight of anhydrous sodium carbonate, separating the liquors from the sodium carbonate, mixing the liquors with hydrochloric acid about 1.14 sp. g. at a temperature of about 80–90° C. in the ratio of about two parts of liquor to about three parts of HCl., separating the benzyl chloride layer, filtering through sodium carbonate, and distilling to separate the benzyl chloride.

In testimony whereof we affix our signatures.

NICHOLAS BENNETT.
HERBERT DODD.
WILLIAM COLIN SPRENT.
FRED HOLT.